Patented Feb. 5, 1946

2,394,255

UNITED STATES PATENT OFFICE 2,394,255

FORMYLACETIC ESTER

Elmore Hathaway Northey, Bound Brook, N. J., assignor to American Cyanamid Company, New York, N. Y., a corporation of Maine No Drawing. Application April 7, 1942, Serial No. 437,940

4 Claims. (Cl. 260—483)

This invention relates to a new method of preparing alkali metal formylacetic ester and more particularly to an improvement in the preparation of crude sodium formylacetic esters used in the synthesis of isocytosine.

Isocytosine has achieved great commercial importance as the best available raw material for the synthesis of 2-sulfanilamido pyrimidine which is an outstanding chemotherapeutic agent. The process involves a number of steps and accordingly the cost of the sulfanilamido pyrimidine is very greatly effected by the cost and yields in each of the steps, the cost of the isocytosine being the most important single factor.

The commercial process for producing isocytosine at the present time utilizes the reaction between sodium formylacetic esters and a guanidine salt such as for example guanidine nitrate. It has been found that the formylacetic ester can be readily made by the reaction of an acetic ester such as ethyl acetate, methyl formate and sodium methylate. The yields have not, however, been as high as could be desired and the low yields have contributed very considerably to the high cost of isocytosine and therefore to the high cost of producing 2-sulfanilamido pyrimidine.

In preparing formylacetic ester fairly low temperatures have, in general, been used because of the extreme volatility of the ethyl formate and ethyl acetate. It was also found that the reaction set free considerable carbon monoxide and the present invention is based on the use of a process in which the reaction takes place under pressure in the presence of an atmosphere of carbon monoxide. Preferably elevated temperatures are used which the present invention makes possible. Higher temperatures greatly reduce reaction time which constitutes an important practical advantage since it permits increased output for a given plant investment. So effective is the use of high temperatures and high pressures of carbon monoxide that it is even possible to dispense with the methyl formate altogether. However, the yields are still better with methyl formate and carbon monoxide both present and with the present prices of methyl formate it is economically more desirable to use it and obtain the higher yields, although reactions in which carbon monoxide is substituted for methyl formate are included in the scope of the invention.

The crude reaction mixture containing sodium formyl acetic ester which is obtained in the first step of the present process requires no purification and can be used in the reaction with the guanidine salt to produce isocytosine without further processing. The second step proceeds smoothly and the advantage of better overall yields and greatly reduced reaction temperature are obtained without any sacrifice in the second step.

The invention will be described in greater detail in conjunction with the specific examples which are illustrative only, the parts being by weight.

Example 1

$CH_3COOC_2H_5 + HCOOCH_3 + NaOCH_3 \rightarrow$
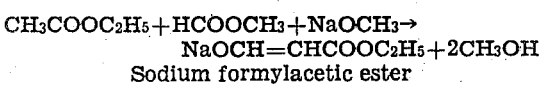
Sodium formylacetic ester 453 parts of sodium methylate are added in small portions to a stirred mixture of 787 parts of 86% ethyl acetate and 420 parts of methyl formate. The addition is at such a rate that the temperature does not exceed 10° C., cooling being provided to maintain the low temperature. After all of the materials are mixed, the mixture is transferred to an autoclave lined with nickel and equipped with a strong stirrer. The autoclave is closed, pressure of 250 pounds per square inch of carbon monoxide applied and agitation started and the charge rapidly heated up to 50° C. The reaction mixture is maintained at this temperature with vigorous stirring until the pressure of carbon monoxide has dropped to about 75 pounds per square inch at which time the autoclave and its contents are rapidly cooled to 27° C. and the autoclave vented. At this stage the product in the autoclave is a creamy mass resembling freshly frozen ice-cream in consistency. The mixture consists of a slurry of sodium formylacetic ester suspended in unreacted ester and methanol formed in the reaction.

$NaOCH=CHCOOC_2H_5 + (NH_2)_2C=NH \cdot HNO_3 + NaOH \longrightarrow$
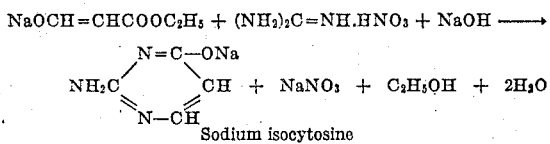
Sodium isocytosine The slurry without isolation is mixed with a slurry of guanidine nitrate, ice and caustic soda to produce sodium isocytosine. This salt is isolated and precipitated with hydrochloric acid and yields isocytosine of at least 98% purity.

The yield is somewhat above 55% of theory based on the methyl formate. In order to determine the effect of the higher temperature and carbon monoxide atmosphere, a control run was made using the same proportions of reacting materials but carrying out the condensation at atmospheric temperature and pressure. The yield was between 40 and 41%.

Example 2

The procedure of Example 1 was followed but no atmosphere of carbon monoxide was provided. The isocytosine yield dropped to between 50 and 51%.

Example 3

The procedure of Example 1 was followed but the reaction temperature was maintained at 60° C. for about a quarter the time. No carbon monoxide was used. The yield of isocytosine was just under 45%.

Example 4

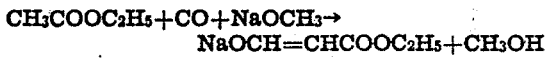
$$CH_3COOC_2H_5 + CO + NaOCH_3 \rightarrow$$
$$NaOCH=CHCOOC_2H_5 + CH_3OH$$

453 parts of sodium methylate were added to 1162 parts of methanol with stirring, the temperature being kept below 25° C. Then 685 parts of 99% ethyl acetate was added and the clear syrupy liquid resulting was introduced into the nickel-lined autoclave. Carbon monoxide was then introduced under a pressure of 150 to 175 lbs. per sq. in., a total of about 43 parts of carbon monoxide being absorbed. The autoclave was heated to about 53° C. for 6 hours and then rapidly cooled to room temperature and vented. The thin formylacetic ester slurry was then condensed with the guanidine nitrate slurry in the usual manner yielding 77.5 parts of isocytosine.

The examples have shown the use of sodium methylate, methyl formate and ethyl acetate. These are respectively the cheapest alkali metals and esters and are therefore preferable for economic reasons. However, the invention is in no sense limited to the use of these particular preferred materials. On the contrary, any alkali metal alcoholate such as the potassium alcoholates may be used and other esters such as methyl, isopropyl or butyl acetate or ethyl or isopropyl formate may be employed.

I claim:

1. A method of producing an alkali metal formylacetic ester which comprises reacting an ester of acetic acid with an ester of formic acid and an alkali metal alcoholate under super-atmospheric pressure in the presence of an atmosphere of carbon monoxide.

2. A method of producing an alkali metal formylacetic ester which comprises reacting an ester of acetic acid with an ester of formic acid and an alkali metal alcoholate under super-atmospheric pressure at an elevated temperature in the presence of an atmosphere of carbon monoxide.

3. A method of producing sodium formylacetic ester which comprises reacting ethyl acetate with methyl formate and sodium methylate under super-atmospheric pressure in the presence of an atmosphere of carbon monoxide.

4. A method of producing sodium formylacetic ester which comprises reacting ethyl acetate with methyl formate and sodium methylate under super-atmospheric pressure at an elevated temperature in the presence of an atmosphere of carbon monoxide.

ELMORE HATHAWAY NORTHEY.